Patented June 19, 1951

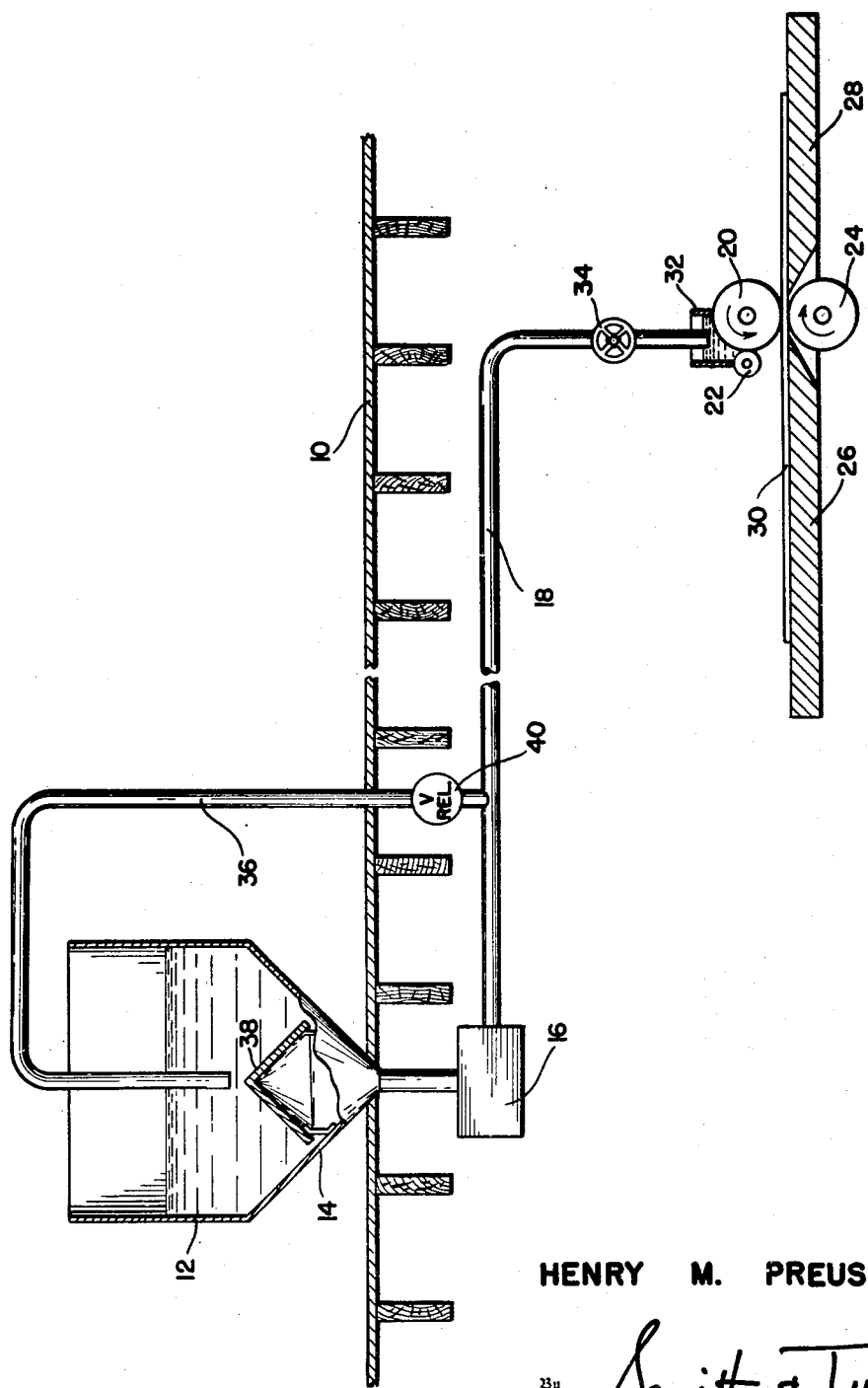

2,557,841

UNITED STATES PATENT OFFICE 2,557,841

MEANS FOR TREATING THIXOTROPIC MATERIALS

Henry M. Preusser, Seattle, Wash., assignor to American-Marietta Company, Adhesive, Resin and Chemical Division, Seattle, Wash., a corporation of Illinois Application May 16, 1949, Serial No. 93,606

3 Claims. (Cl. 259—1)

This invention relates to a means for treating thixotropic materials and, more particularly, is the provision of a novel method and means to permit the employment of the useful characteristics of proteinous materials which readily gel and otherwise become practically useless.

"Thixotropy" is a property or phenomenon exhibited by some materials, which tend to gel or solidify at rest, of becoming fluid when agitated as by stirring or shaking, and of resolidifying or coagulating when again allowed to come to rest. Hence, a thixotropic material is any material that tends to gel but can reversibly be made fluid under mechanical action. I have found that a shearing action is suitable for returning certain gelled thixotropic materials to a state of mobility of fluidity.

In connection with the present invention, I particularly have in mind soya bean meals of the type useful in the adhesives industry for forming a glue line between pieces of woody or similar material. Soya meal adhesives are commonly used in gluing up veneers to form plywood and, there, probably find their greatest use. Until about 1945 soya bean meals were produced by what is known as "expelling presses," which squeezed the oil of the ground beans and largely removed the oily content.

It has been determined that earlier expeller treated meals had undesirable thixotropic characteristics which were not fully understood. Such thixotropy probably resulted from the heating attendant with the expelling pressures. These characteristics manifested themselves in glue mixes, for example, by undesirable increases of viscosity in a batch of glue. For the purpose of decreasing viscosity it has been the practice of the workers in the art to employ chemical materials such as added amounts of caustic. Such a practice is set forth in the Laucks et al. Patent No. 1,903,172, particularly in claim 10, wherein these patentees prescribed the step of adding an additional amount of caustic material for the purpose of reducing viscosity. The end result of lower viscosity was there obtained but to the detriment of the glue mix because of the denaturing of the protein in the mix which caused a loss of desirable adhesive properties. It is obvious that such practices are undesirable and it, therefore, is an object of my invention to obtain lower viscosity in proteinous mixtures without affecting the character of the protein and while avoiding thixotropy for the purposes intended, and, more particularly, to reduce viscosity in proteinous glue mixes without harm to the adhesive characteristics of the glue.

At about the time of the cessation of recent hostilities, solvent extraction became widespread, due to the availability of petroleum components and, particularly, hexane which washes the oil out of the meal to a much higher degree than previously was possible. The solvent extraction process, however, is accompanied by its own peculiar problems, one of them being the removal of the hexane that is entrapped in the meal following oil extraction. Not much is known about the various processor's methods of removing the residual hexane, but it is known that such follow two lines of attack. One is to heat the meal to above the boiling point of the hexane to cause the latter to volatize and go off in a gaseous form. This causes denaturing of the protein. The other apparently involves the use of less heat and includes a bath of hexane vapor which seems to extract and absorb the entrapped hexane from the meal. Where the meal is heated substantially it has less desirable characteristics from an adhesive standpoint including being thixotropic. Where the meal is subjected to a minimum of heat, it has superior adhesive properties but is highly soluble, tends to lump in aqueous mixtures, foams unreasonably, and has a low viscosity characteristic coupled with excessive thickening when the mix is allowed to stand. In other words, such meal is highly thixotropic. This latter meal is described in the trade as a "green meal," for the reason that it has a green odor reminiscent of green alfalfa.

Adhesives formed of this green meal have been practically impossible to use in, for example, the plywood industry for the reason that when a useful sized batch of adhesive is compounded for use in the glue spreaders, it would gel so fast and so firmly before it could normally be used, that it would not readily flow by gravity nor could it be pumped to the point of use. Of course, small batches used immediately after compounding would flow and spread but that would necessitate constant glue batch preparation which is not practical. However, it is easily to be established that adhesive formed of green meal, if it can be handled practically, produces a worthwhile product, because of its superior adhesive and bonding qualities in a plywood panel. Such a meal is valuable because of the low degree of protein heat-denaturation. But such a meal requires, for practical use as an adhesive, control of foaming, avoidance of lumping and elimination of excess viscosity caused by thixotropy, but without water or caustic treatments to maintain this control.

Among the important objects of this invention have been the provision of a method of treating thixotropic materials to maintain them in a mobile or fluid condition desirable for their use; of a method for treating such materials, when formed of green or other soya meal, to make it possible to use such meal in the glue spreading operation of a woodworking plant, and, particularly, in plywood mills; of apparatus for treating thixotropic adhesive materials of green meal derivation to impart mobility and fluidity to the same to make them useful in presently employed conveying and spreading equipment; of a method and means for imparting a shearing action to such materials in a manner as to produce fluidity while preventing or precluding the entrainment of air and the tendency of the material to form in an undesirable manner; of a process and apparatus employing fluid and mobile adhesives having thixotropic characteristics to a body of such material in its gelled condition so as to facilitate the latter being made fluid but without trapping or entraining air in the material; and, very importantly, to permit the employment of highly trixotropic soya meal adhesives and their attendant quick-gelling properties to facilitate the production of "no clamp" plywood.

These and other objects of my invention will be more apparent during the course of the following specification in which I have set forth exemplifying situations and the methods and apparatus by which my invention is practiced. But first, briefly, I have discovered that adhesives formed of green meal are thixotropic and can be returned to a mobile state after gelling by subjecting them to a shearing action of a mechanical nature. I have further discovered from my work with the material that such shearing as is performed on the adhesives must be conducted under submerged conditions in a manner that air cannot get into the adhesive as it is being mechanically worked; otherwise so much air is entrained in the material that it becomes excessively foamy and unuseful for glue films in the plywood field. I have further discovered that once a gelled material has been again made mobile and is then returned to a mass of gelled material in a dispersed manner, it will tend to make fluid a certain portion of the gelled material. In this latter respect I am referring to recirculating the mobile and fluid adhesive material back to the batch from which it was drawn so as to maintain a fairly high fluidity within the batch container and so that a constant gravity actuated or pressurized stream flowing to the glue spreaders can be had.

I first observed the phenomena of thixotropy in green soya meal adhesives in a mill where trouble was being encountered with glue that gelled too rapidly and would not maintain a feeding stream from the glue pot to the spreader. When the viscosity of this glue was reduced in the pot by the addition of caustic material, or water, the stream to the spreader could be maintained but by the time that the material had passed between the doctor and the applicator rolls of the spreader, it had become so thin that it was not practically useful for forming a glue line on veneer. When a portion of gelled glue was deposited on the rolls and passed to the application point, it assumed a suitable viscosity to form a good glue line. It was determined that the mechanical shearing action that took place between the rolls of the spreader was the necessary agitation to produce fluidity. However, since the operation was conducted in the open, there was an entrainment of air that resulted in some undesirable foaming of the material.

I have carried forward the thought of employing a mechanical shearing action on the gelled or gelling material with considerable success under the actual working conditions found in plywood mills. Highly acceptable results were obtained by withdrawing portions of gelled material from the contents of the glue pot and subjecting such withdrawn material to a mechanical shearing action under submerged conditions to preclude the entrainment of air and in a manner that all the material was caused to be sheared. While practical results were had by performing the shearing action with a wire whisk so operated that no vortices were created and only a minimum of surface break occurred, the most practical method of making fluid the gelled material was to withdraw portions of gelled glue from the bottom of the glue pot and introduce it immediately into the chamber of a gear pump where it rapidly become fluid to a degree that permitted its conduction in pipes reasonable distances to a glue spreader. It was found that since glue application in the plywood mill was not constant, there were intervals when there was no demand for glue. During those intervals, which are fairly regular and usually protracted, the outflow from the pump was returned to the glue pot in a closed circuit operation. It was found not satisfactory to let the return flow plop or splash into the pot for the reason that it tended to foam the material very undesirably. If the returning stream had substantial pressure and was fairly solid, it tended to cut through the gelling glue in the pot and pass directly to the outlet from the pot without material effect on the gelled glue in the pot. To overcome this defect, I then arranged that the glue be discharged into the pot upon a conical distributor head which gradually decreased and decelerated the flow and spread it over a wide area of the gelled glue. It was thereupon observed that the more fluid the returning glue material was, the more it tended to make fluid the gelled material of the pot and to thus facilitate its being maintained in fluidity. As a result of this work, I have determined that the process best adapted to the practical conditions of handling highly thixotropic glue materials in plywood mills is to, between the intermittent intervals of withdrawal of glue from the system to supply the spreaders, withdraw portions of the adhesive composition and to subject it to a submerged mechanical shearing action so practiced as to prevent air entrainment whereby to make the material fluid and mobile and then to return the same to the pot in a dispersed manner.

By so doing, I not only insured that there was a constant supply in the system of fluid glue for use in the spreaders, but also that I was able through recirculation during the non-withdrawal periods of spreader application to maintain fluidity in the container. Further, the mechanical shearing action tended to reduce lumps of improperly mixed glue materials to a proper state of blending and smoothness through what was, in effect, a wet grinding operation. To a certain extent there was also to be observed a defoaming or foam depressing effect upon the glue mix that of course was highly desirable. It should also be understood that my process produced a longer wet glue life, imparted more uniform spreading properties to the glue, and tended to reduce wood staining of the glue on the veneer as compared with chemcally reduced glues including substantial amounts of caustic added for that purpose.

In the accompanying drawing I have shown a typical installation of mechanism which can be employed to practice my process. A usual plywood mill will have a floor 10 above the floor on which most of the mechanical steps followed in making plywood are practiced. The floor 10 is usually that of a loft or gallery in which the glue mixing operation is conducted in a pot or container 12 having upper upright walls and a lower converging hopper bottom 14. The outlet of the hopper bottom 14 is practically directly into the casing of the shearing mechanism 16 which I prefer to take the shape of a gear pump of conventional construction. The discharge outlet of the mechanism 16 is connected to the discharge conduit 18 that is lead to a more or less remote spreading operation that is conducted in a machine having the applicator roll 20, its doctor roll 22 and the backing roll 24. Usually such a spreader includes table-like plates 26, 28, over which the veneer 30 moves as it passes between rolls 20 and 24 to have glue applied to its upper surface. The conduit 18 delivers glue to between rolls 20 and 22 as shown in the drawings by depositing it in the glue box 32. A valve 34 controls the delivery of glue to the glue box.

For the purposes of creating a recirculation system for the glue material that is flowing out of the positive displacement pump 16 during non-applicating intervals of the spreader, I provide the return conduit 36 that rises alongside the pot 12 to over its rim and thence down into the pot to a suitably low level therein. Material flowing out of the discharge end of conduit 36 is deposited upon the conical distributor or baffle 38 where it tends to film out and flow throughout the contents of the pot in a widely dispersed and distributed manner and with low velocity for the reasons earlier stated.

It is preferable that the lower conical portion 14 of the pot 12 be symmetrically shaped and of such a slope that the mere weight of the glue, especially in a gelled state, tends to crowd down toward the outlet. If the slope is too flat or the container not properly symmetrical, manual assistance as by the use of a paddle, will be needed to get the glue to the outlet and the shearing device 16.

The recirculation conduit 36 has a valve 40 therein close to the point of connection of conduits 36 and 18. A preferable arrangement is to employ a pressure relief valve at 40 which is normally closed when valve 34 is open and opens when valve 34 is closed. Alternatively, valves 34 and 40 have been pneumatically operated on occasion with the opening of one synchronized to the closing of the other, and vice versa.

My approach to the problem of undue thickening and gelling of proteinaceous adhesive mixes has, in several installations, solved problems of long standing. Within the extensive experiences of people in the industry, there appears never to have been an approach by way of mechanical agitation of the gelled material. I believe this is true because it has not previously been understood that the material was thixotropic. This I believe to be the essence of my discovery.

While I have spoken of the mechanical shearing device employed in the apparatus and designated 16 in the drawings as a gear pump, it should be apparent that this element is essentially a positive displacement rotary pump and finds its equivalent in other than gear pumps so long as there is a submerged shearing agitation or action practiced. It will be understood that other modifications and changes may be made in the combination and arrangement of apparatus for practicing my process without departing from the scope and spirit of my invention.

What is claimed is:

1. A mechanism for processing and moving thixotropic materials, comprising: a container to receive a batch of thixotropic material, said container having a lower outlet opening; a pump connected in an air tight manner to said container at said outlet opening and located in close proximity to said outlet opening; a return conduit connected in an air tight manner to said pump and leading to said container below the top of said container and below the normal batch level in said container; and a baffle positioned in said container in close proximity to the discharge end of said return conduit in said container and in position so that material flowing from said return conduit will impinge on said baffle and tend to be dispersed throughout said container, the impingement surfaces of said baffle being at a substantial angle to the direction of the return flow.

2. The subject matter of claim 1 in which there is a discharge conduit connected in an air tight manner to said pump for conveying said material from said container in which there is valve means for said conduits to control flow from said pump through said pump; and which said pump is a low velocity, high shearing positive displacement rotary pump.

3. The subject matter of claim 2 in which said container has an inverted conical shape; and said baffle has an upright conical shape and is positioned between the discharge end of the return conduit and the outlet opening; and in which said discharge opening is axially located in the lower end of said container.

HENRY M. PREUSSER.

REFERENCES CITED

The following references are of record in the file of this patent:

UNITED STATES PATENTS

| Number | Name | Date |
|---|---|---|
| 1,438,733 | Werner | Dec. 12, 1922 |
| 1,671,868 | McGougan et al. | May 29, 1928 |
| 2,145,198 | Kiesskalt | Jan. 24, 1939 |
| 2,148,608 | Stubner | Feb. 28, 1939 |